April 5, 1932. W. B. LONG ET AL 1,852,324
COMBINATION WOODWORKING MACHINE
Filed Oct. 10, 1931 11 Sheets-Sheet 4

Inventors:
W. B. Long and F. C. Arey,
By Wm. F. Freudenreich
Atty

April 5, 1932. W. B. LONG ET AL 1,852,324
COMBINATION WOODWORKING MACHINE
Filed Oct. 10, 1931 11 Sheets-Sheet 7

Inventors:
W. B. Long & F. C. Arey,
By Wm. F. Freudenreich, Atty.

April 5, 1932.  W. B. LONG ET AL  1,852,324
COMBINATION WOODWORKING MACHINE
Filed Oct. 10, 1931    11 Sheets-Sheet 11

Inventors:
W. B. Long & F. C. Arey
By Wm. F. Freudenreich
Atty.

Patented Apr. 5, 1932

1,852,324

UNITED STATES PATENT OFFICE

WILLIAM B. LONG, OF PUNXSUTAWNEY, PENNSYLVANIA, AND FRED C. AREY, OF OAK PARK, ILLINOIS; SAID AREY ASSIGNOR TO SAID LONG

COMBINATION WOODWORKING MACHINE

Application filed October 10, 1931. Serial No. 568,118.

The present invention has for its object to produce a simple and novel compound machine which will be safe in operation, efficient, durable and be easily adjustable for the different kinds of work.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

In the drawings we have illustrated our invention as applied to a machine embodying a saw, a jointer, and a sanding device and, for the sake of brevity the detailed description will be confined to this particular embodiment, although the invention is not limited to this particular style of machine.

Figures 8, 9, 10:
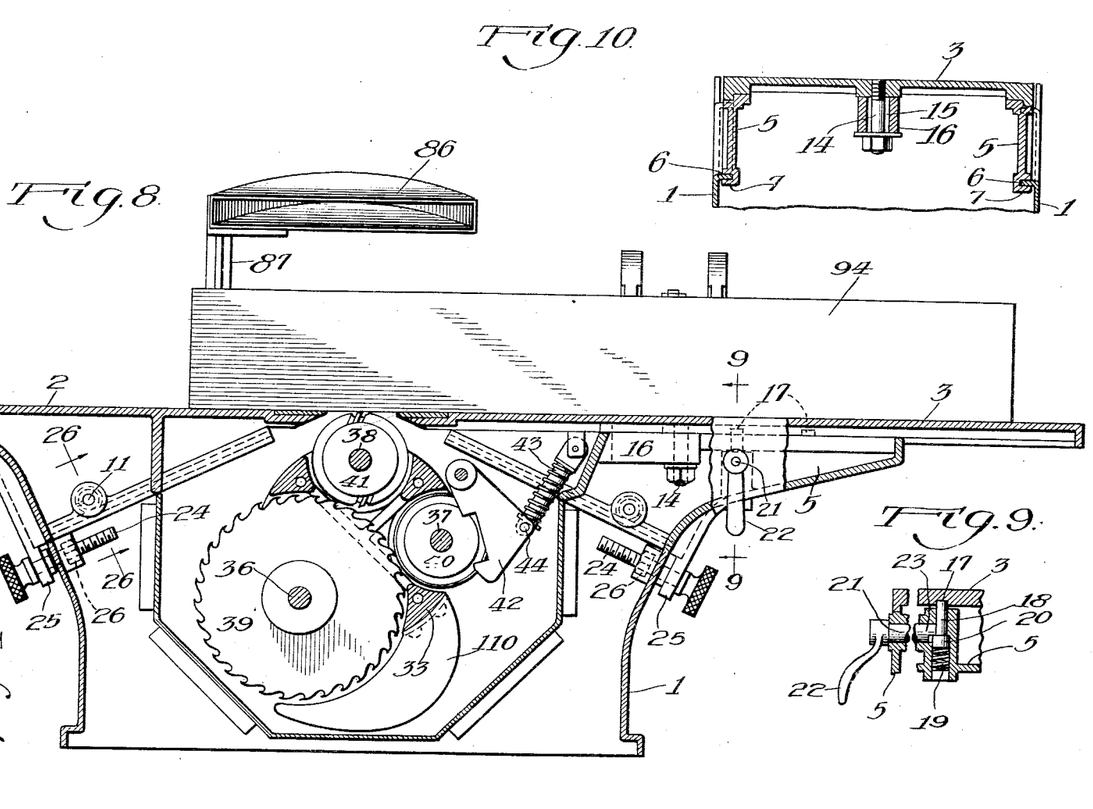
Fig. 8 is a view similar to Fig. 6, showing the joiner tool in working position, whereas the saw is shown in working position in Fig. 6.
Fig. 9 is a section on line 9—9 of Fig. 8 or on line 9—9 of Fig. 6, showing only a fragment of the machine sufficient to illustrate the lock for the table.
Fig. 10 is a section on line 10—10 of Fig. 6, showing only a fragment of the machine.
Figures 23, 26, 27:
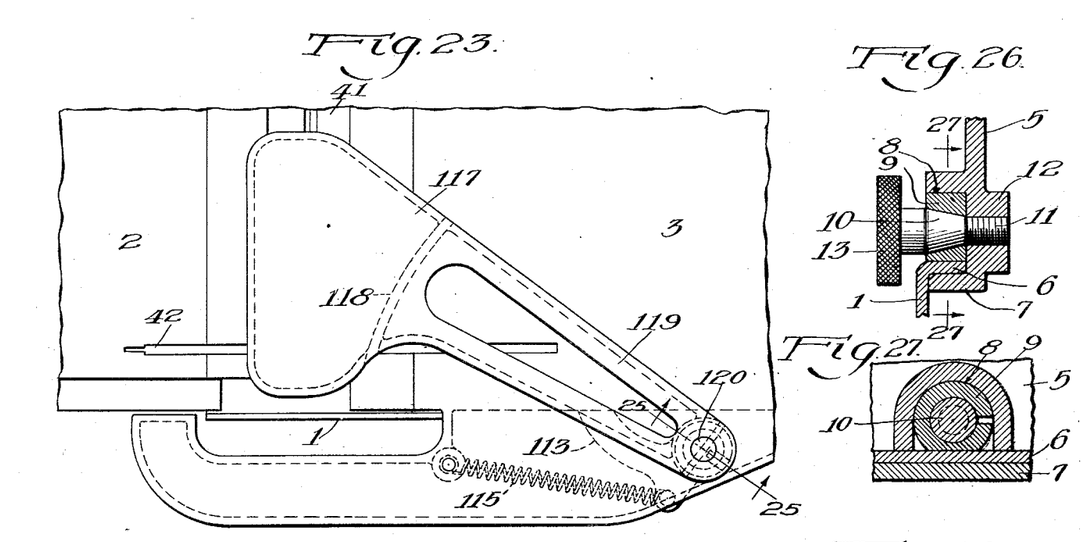
Fig. 23 is a top plan view of a fragment of the bed of the machine, on a larger scale, showing a safety device adapted to be used in connection with the jointer.
Fig. 26 is a section, on a larger scale, on line 26—26, of Fig. 6.
Fig. 27 is a section on line 27—27 of Fig. 26.

Referring to the drawings, 1 represents a hollow base closed at the top by two aligned horizontal table members 2 and 3. The two table sections are mounted upon slides 4 and 5, respectively. The upper edges of the slides 4 and 5 are horizontal, whereas the lower edges are inclined downwardly in opposite directions from a transverse line; these inclined halves resting on complementary inclines or slopes on the stationary base, whereby the table sections may be raised and lowered by simply moving the slides in or out. As best shown in Fig. 10, the side walls of the hollow base have inturned flanges 6 along their inclined top edges; the slides resting on these flanges and having portions 7, extending underneath the flanges. Or, viewing the construction in another way, the flanges on the base or frame may be said to fit slidably into grooves in the slides. In Figs. 26 and 27 we have illustrated the means for locking the slides to what may be termed their supporting tracks or rails. It will be seen that each of the slides has in the outer side a pocket 8 bounded on the bottom by the flange 6. Within this pocket is a split ring 9 resting on the flange or rail 6. The ring has a conical bore into which fits a conical plug 10 having a screw threaded inner end 11 that is screwed into a boss 12 forming the inner wall of the pocket. On the outer end of the plug is a head 13 by means of which it may be turned. It will be seen that by screwing in the plug 10, the ring 9 will be expanded, pressing up on the overlying part of the slide and down upon the flange or rail 6. In this manner the part 7 that underlies the flange or rail is thrown up into intimate contact with the latter.

Figures 6, 7:
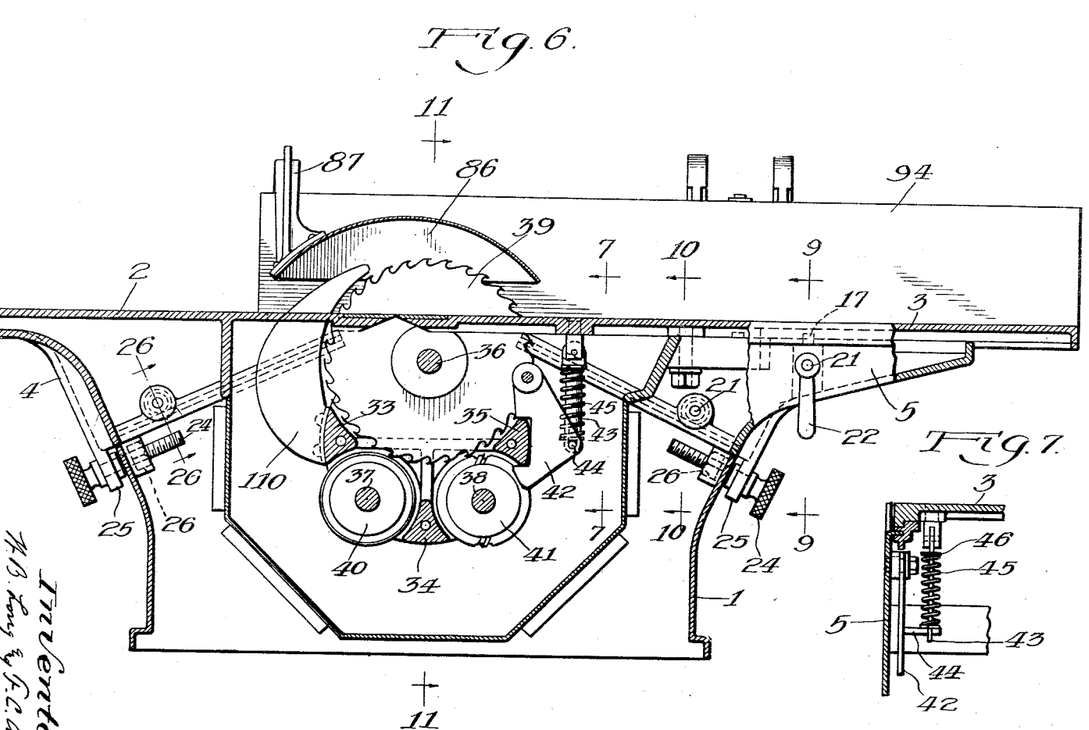
Fig. 6 is a section on line 6—6 of Fig. 1, the scale being the same as that of Fig. 2.
Fig. 7 is a section on line 7—7 of Fig. 6 showing only a fragment of the machine.

The table section 3 is slidable along its supporting slide, being held down, in the arrangement shown, by a bolt 14 extending down through a slot 15 in a part 16 of the slide 5; this slot being elongated in the direction of the length of the machine so as to permit the table section to be slid back and forth within the limits of the length of the slot. Normally, when the machine is not in use or the saw is being employed, the two table sections abut against each other as shown in Fig. 6. When the jointer or sanding device are brought into play, the table sections must be separated from each other to permit these tools to emerge as shown in Fig. 8. This separation of the table sections is conveniently accomplished by moving only the section 3, as heretofore explained. By making the slot 15 of the proper length, the table section 3 may be brought into working position by simply pushing it to the corresponding end of the slot. Then, to hold this table section in place, it needs simply to be locked in a suitable way. In the arrangement shown, there are two seats or depressions 17, 17 in the under side of the section 3. In a supporting slide 5 is mounted a pin 18 below which is a spring 19 that tends constantly to press the pin up. The parts are so proportioned that the pin is in the path of travel of the seats or depressions, 17, 17, whereby when either of these seats or depressions registers with the pin, the spring forces the pin up and thus locks the table section. The pin may be released in any suitable way. In the arrangement shown, there is a head 20 on the lower end of the pin. Extending laterally through the side wall of the member 5 is a short shaft 21 having on the outer end a handle 22. The shaft is cut away at one side, at the inner end, so that the remaining portion 23 constitutes a cam overlying the head on the pin. The parts are so proportioned that when the cam 23 is on the upper side the pin is free to move into its locking position; whereas, when the shaft is turned so as to carry the cam element downward, the pin is also pushed down to free the pin from the table.

It should perhaps be noted that fine adjustments of the slides 4 and 5 may be made by means of screws 24 each extending through and rotatable in, but held against lengthwise movements with respect to an ear 25 on the corresponding slide and screwed through a stationary part of the base or through a nut 26 held in a stationary part of the base, as shown in Figs. 6 and 8.

Figure 11:
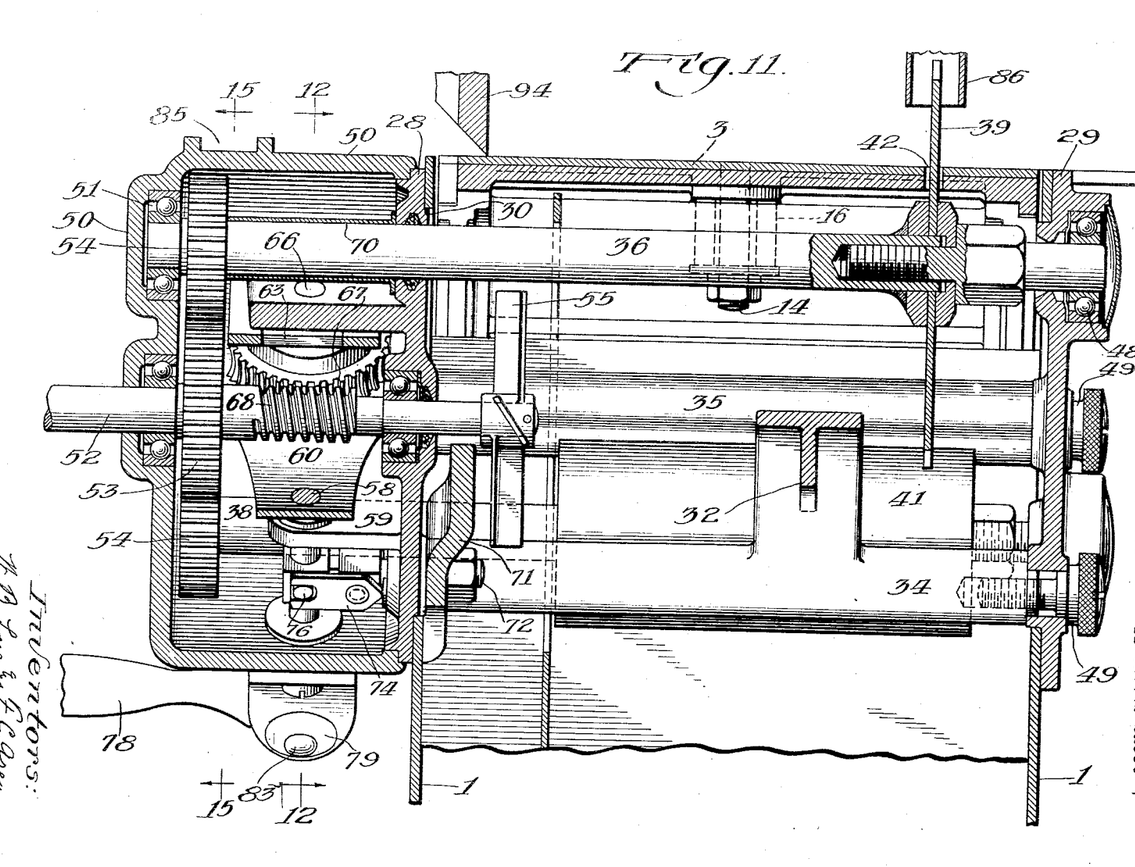
Fig. 11 is a section, on a larger scale, on line 11—11 of Fig. 6, and is also a section on line 11—11 of Fig. 12.
Figures 12, 13, 14:
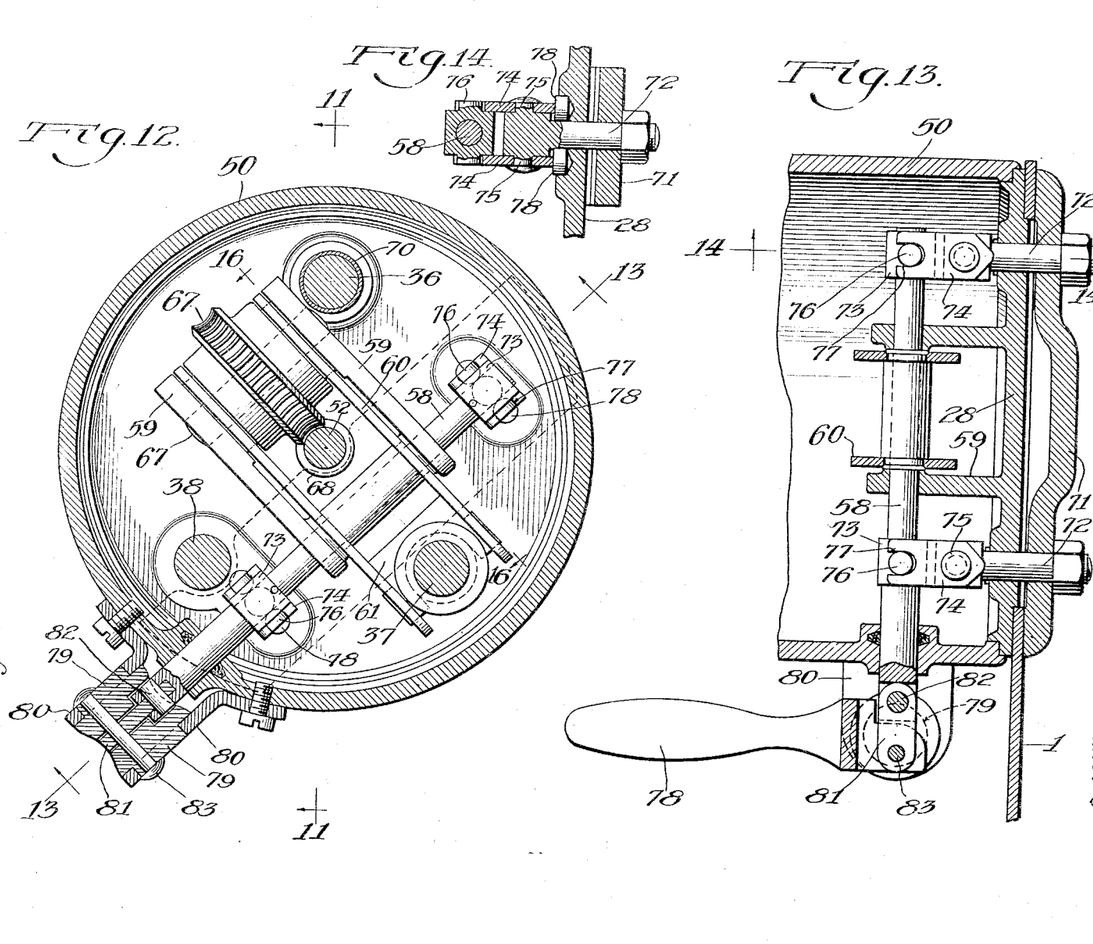
Fig. 12 is a section on line 12—12 of Fig. 11.
Fig. 13 is a section on line 13—13 of Fig. 12, only a fragment of the machine being shown.
Fig. 14 is a section on line 14—14 of Fig. 13.
Figures 15, 17:
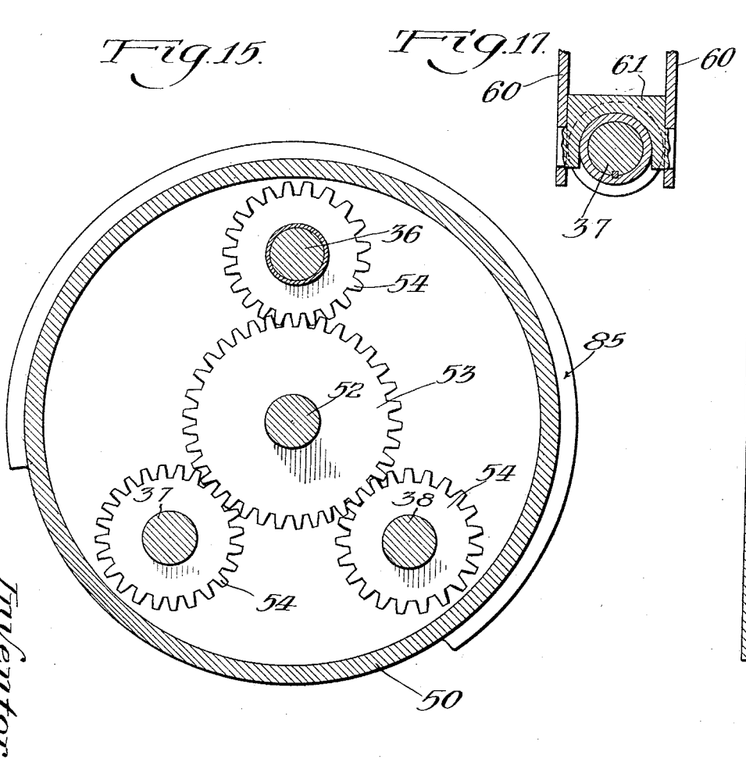
Fig. 15 is a section on line 15—15 of Fig. 11.
Fig. 17 is a section on line 17—17 of Fig. 16.

Within the hollow base, under the table, are the tools. The tools are mounted on suitable shafts extending between two connected circular heads 28 and 29, as best shown in Fig. 11. Each head has on the inner side a short circular boss of large diameter, indicated at 30 and 31, fitting into large openings cut into the side walls of the hollow base; the heads lying outside of these side walls. The two heads are connected together by means of a spider 32 having three long parallel bars 33, 34 and 35, two of which are spaced about one hundred and eighty degrees, whereas the third is spaced apart equally from the other two; all three bars being at equal radial distances from the axis of rotation of the tool carrier. As shown in Figs. 6 and 8, the tools are mounted on three shafts 36, 37 and 38, respectively, extending between the heads at equal distances from the axis of rotation and the carrier. The shaft that carries the saw 39 lies in the wide gap between the bars of the spider to afford the necessary clearance for the saw which is much larger in diameter than the sanding device 40 or the jointer 41 that are mounted on the other shafts. The saw as shown in Fig. 11 lies at one side of the machine and comes up through a slot 42 in the table, when the carrier is brought into sawing position; the saw, being of larger diameter than either the sanding device or the jointer, will of course project much farther above the table when in working position, than do these other devices. The table need not be disturbed for the purpose of raising or lowering the saw, but the sections thereof must be separated whenever the sander or the jointer is brought up.

As will hereinafter be explained, the tools are brought into their working positions and their positions of rest by simply turning the carrier. Whenever the table is in a closed condition, the sections must be separated from each other before the sander or the jointer can be brought into working positions. Therefore, in order to prevent the sander or the jointer from striking against the under side of the table, in case the workmen have failed to separate the sections thereof, we have provided an inter-lock between the movable table section and the carrier for the tools, that will prevent the sander or the jointer from being raised unless and until the table has been properly opened. To this end, as best shown in Figs. 6 and 8, there is hung a dog 42 from one of the side walls of the stationary base in position to engage with the first bar of the spider, as the tool carrier is turned, that reaches the dog; thus locking the carrier against turning movements in either direction. The dog is held in its working position by a rod or bar 43 hung from the under side of the table section 3 and connected to the dog by a pin and slot device 44. A compression spring 45 surrounds the rod or bar, resting at its lower end on the pin member or the pin and slot connection and bears at its upper end against a shoulder 46 on the rod or bar.

When the table is closed, as shown in Fig. 6, the dog is yieldingly held in a position to snap into engagement with the first of the bars on the spider that reaches it; the pin and slot connection permitting the necessary swinging movement for this purpose. Therefore neither the sander nor the jointer can be brought up to the table while the table is closed. However, when the section 3 of the table is thrown out, as shown in Fig. 8, it pulls the dog away from the spider and leaves the latter free to turn.

The several tool carrying shafts extend into and are supported by ball bearings 48 in the head 29 of the carrier; these ball bearings being so designed that they will remain intact in the head when the head is disconnected from the spider. As best shown in Fig. 11, the head 29 is connected to the spider by means of machine screws 49 passing through the head and into the adjacent ends of the bars of the spider. Therefore, upon removing the screws 49, the head may be taken off, giving access to the tools and permitting removal and replacement of the latter through the opening in the side wall of the base.

The arms or bars 33—35 of the spider are fixed to the head 28, being preferably integral therewith.

The shafts for the tools extend through the head 28 and into a gear casing 50 attached to this head. The corresponding end of the saw shaft runs in a suitable ball bearing 51 in the end wall of the gear casing. A drive shaft 52 extends through and has bearings in the end wall of the gear casing and the head 28. On the drive shaft is a gear wheel 53 meshing with pinions 54 on the several tool shafts. Therefore, whenever the drive shaft revolves all of the tools also revolve. On the inner end of the drive shaft is a fan 55 to draw the dust and chips away from the cutting or abrading points. A partition 47 within the base separates the interior into two compartments in one of which the tools are positioned and in the other of which the fan lies; the partition having an opening for the passage of the tool carrier. The waste is carried away from the fan compartment in any suitable manner.

The drive shaft may conveniently be driven from a suitable electric motor 56 positioned beside the machine; the hollow base and the motor being conveniently mounted on a single sub-base 57.

Figure 16:
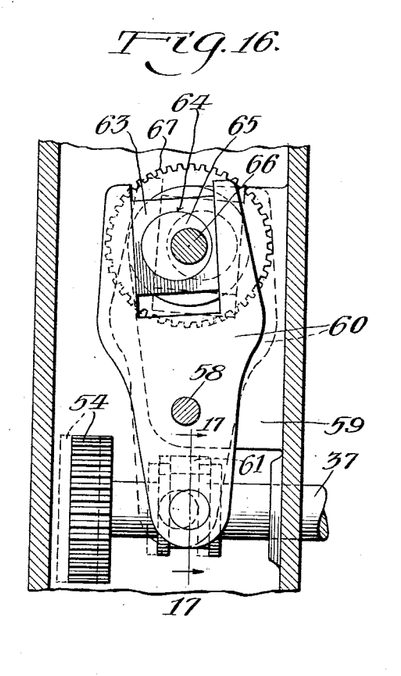
Fig. 16 is a section on line 16—16 of Fig. 12.

The sanding roll 40 should be reciprocated in the lengthwise direction while rotating. To this end we have mounted on shaft 58 that extends through and is supported by brackets 59, 59 between and at right angles to the motor shaft and the sander shaft, a pair of rocker arms 60, 60. These rocker arms lie on opposite sides of the shafts 52 and 37 and extend past both of them. Between the lower ends of the rocker arms is journalled a semi-circular fork 61 that embraces the upper half of the shaft 37 between and in contact with two collars 62, 62 fixed on the shaft. Therefore, when the arms are rocked, the shaft is reciprocated. The rocking of these arms is brought about as follows: The rocker arms lie between the brackets 59, each close to one of the brackets. The ends of the arms farthest from the sander shaft are forked as best shown in Fig. 16, and in these forks are slidably mounted blocks 63 each having therein a large round hole 64. In each hole is an eccentric 65 fixed to a shaft 66 extending from one bracket 59 to the other and journalled in the brackets. On the shaft 66 is a worm wheel 67 meshing with a worm 68 on the motor shaft. Consequently, as the motor shaft revolves, the rocker arms will be oscillated and the sander shaft will reciprocate while rotating.

Whereas the sander shaft is positively reciprocated, the saw shaft should be held against end play. This may conveniently be accomplished by surrounding the saw shaft with a sleeve 70 engaged at one end with the pinion 54 thereon and at the other end with the head 28.

Means must be provided for turning the tool carrier and for locking it in any position into which it may be brought. In the arrangement shown there is a single handle for moving the carrier and also locking it after having been moved into any desired position. The locking devices are best shown in Figs. 11–14. Referring to these figures, 71 is a bar lying inside of stationary wall on the outer side of which the head 28 is located and spanning the opening in which the head turns. Two bolts 72, 72, pass loosely through the ends of the bar and through the head 28 within the area of the opening in which the head turns. The outer ends of the bolts lie directly beneath the shaft 58 to which previous reference has been made. The long axes of the bolts 72, 72 and the long axis of the shaft 58 lie in the same plane and the heads of the bolts lie near the shaft. On the shaft are fixed blocks 73, 73, one opposite each bolt head. The blocks and the bolt heads are connected by two plates 74, 74, lying on opposite sides thereof. Each bolt head has thereon two trunnions 75 extending through openings in the two adjacent plates, and each block has two trunnions 76 entered in bearing seats 77 in and opening out of the outer ends of the corresponding plates. The inner ends of the plates rest on hardened steel insets 78 in the head 28. When the plates 74 stand at right angles to the shaft 58 they press against the head and exert a pull on the locking bar, causing the head and bar to clamp the stationary wall firmly between them and lock the carrier against rotation. Upon shifting the shaft 58 lengthwise, the plates 74 are tilted out of engagement with the head, and the head is therefore left free to turn.

The shifting of the shaft 58 is effected by a handle 78 on the outside of the gear casing; the handle having trunnions 79 of large diameter journalled in brackets 80 projecting from the casing. The shaft is connected to the handle by a link 81, secured at one end to the shaft by a transverse pin 82 and at the other end to the handle by a pin 83 passing through the handle at and eccentric to the journals 79. The parts are so proportioned that when the handle lies beside the gear casing as shown in the drawings, the shaft has been pulled out and caused the carrier to be locked. Upon swinging the handle out into a more or less radial position, the shaft is pushed in and unlocks the carriage. In this latter position the handle serves as a projecting arm by which the carriage may easily be turned. Therefore, when the carriage is to be shifted, the handle 78 is simply swung out into a radial position, unlocking the carriage, and is then employed as a projecting arm to turn the carriage; the carriage being locked in its new position by the act of again swinging the handle alongside the gear casing.

Figure 1:
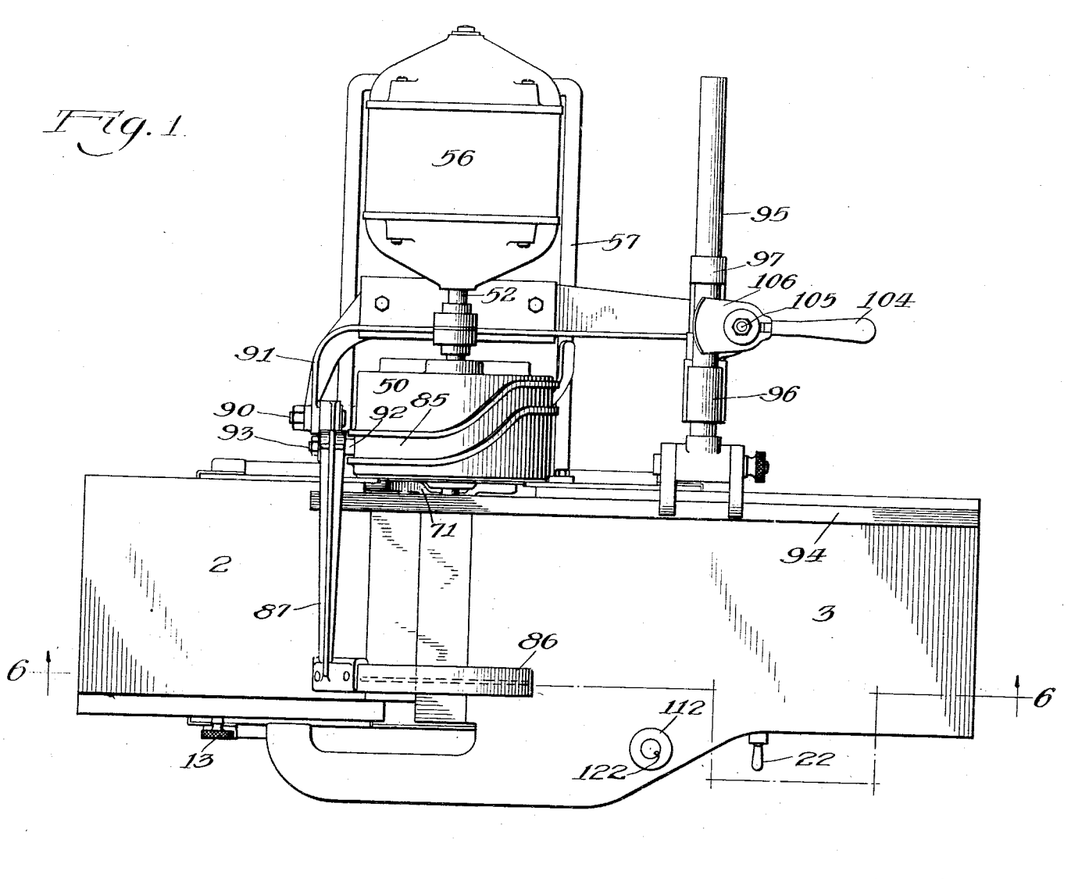
Figure 1 is a top plan view of a machine embodying the invention in a preferred form.
Figure 2:
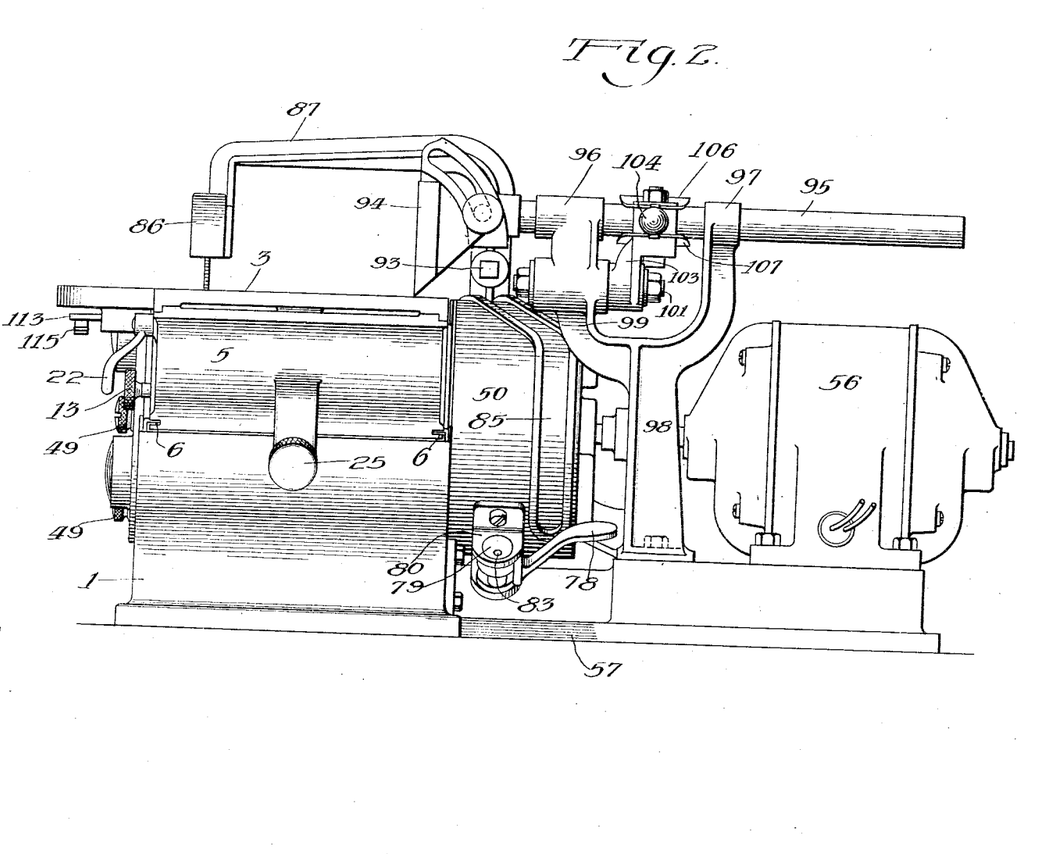
Fig. 2 is an end view, looking at the right hand end of Fig. 1, and the scale being somewhat larger than for Fig. 1.
Figure 3:
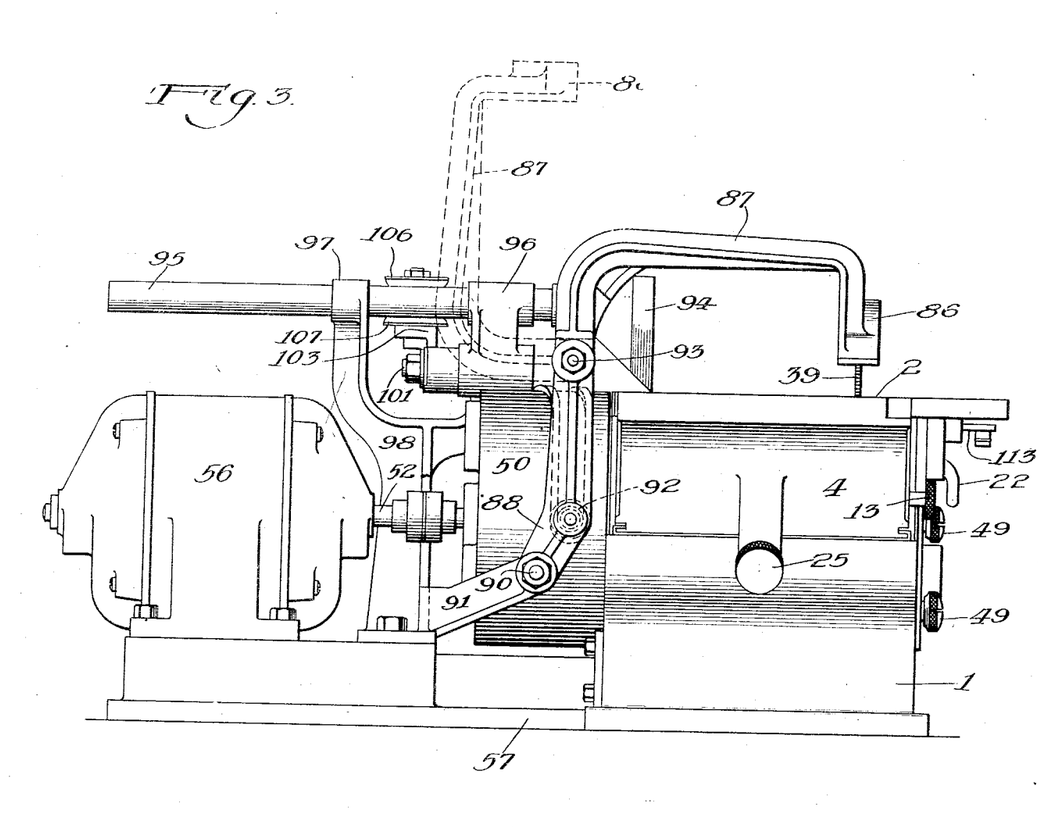
Fig. 3 is a view similar to Fig. 2 showing the opposite end of the machine and showing, in dotted lines, the saw guard in an idle position.
Figures 4, 5:
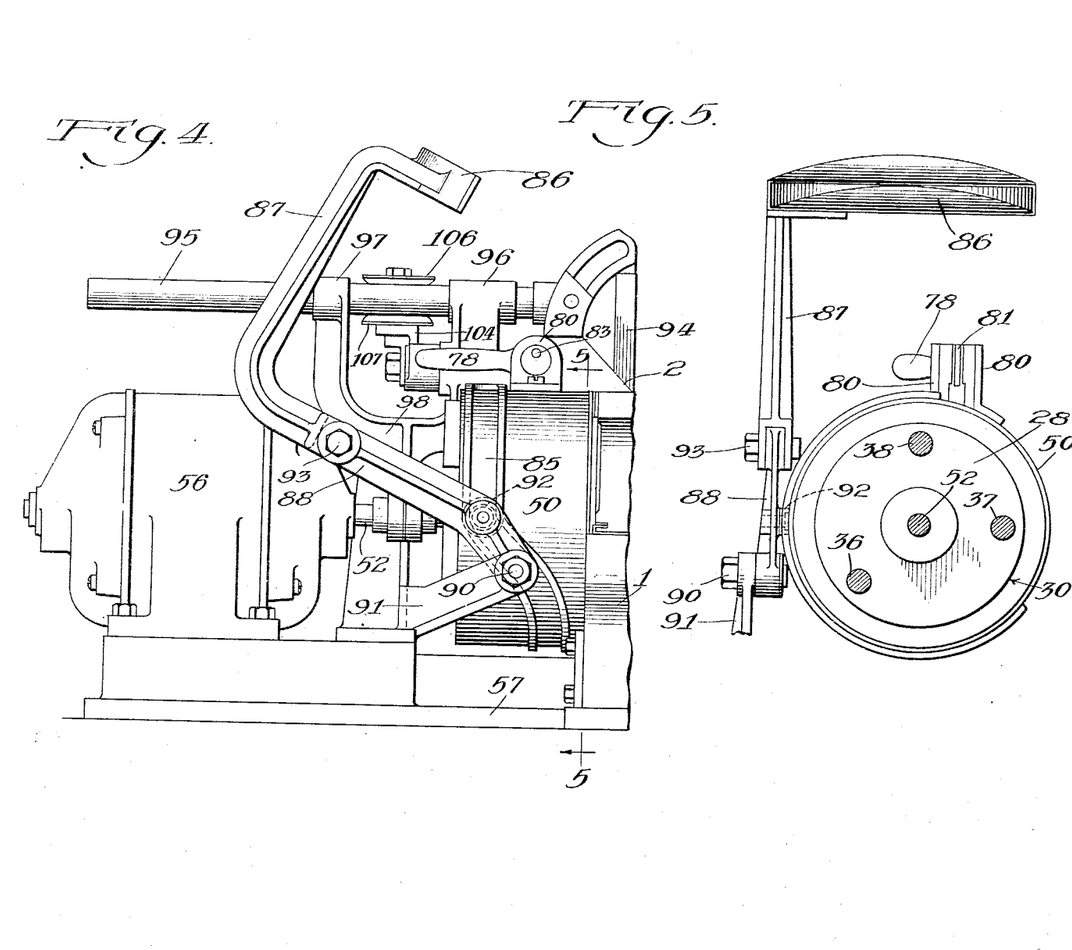
Fig. 4 is a view similar to Fig. 3, showing only a part of the machine, the tool carrier having been shifted to drop the saw.
Fig. 5 is a section on line 5—5 of Fig. 4.

There should be a guard over the saw when the latter is in sawing position, and this guard should be moved out of the way when the other tools are being used. Since the gear casing is a part of the carriage for the saw, the saw guard may conveniently be shifted between working and idle positions through the action of the gear casing. The gear casing is, for this purpose, provided with a peripheral cam groove 85 to cooperate with an element associated with the saw guard. In the arrangement shown, as best appears in Figs. 1–5, the guard 86 is located on the free end of one arm 87 of an L-shaped member, the free end of whose other arm 88 is pivoted, as indicated at 90, to a bracket 91 fixed to a part of the stationary frame of the machine. The arm 88 has thereon a cam roll 92 entered in the cam groove 85. The parts are so proportioned that when the gear casing is turned to raise the saw, the guard will be swung down so as to overlie the saw as shown in full lines in Fig. 3; whereas, when the saw is retracted, the guard is swung back out of the way into the position indicated in Fig. 4. It is sometimes of advantage to be able to swing the guard out of the way while the saw is up. We have therefore divided the arm 88 and joined the two parts thereof by a hinge pin 93 in the form of a bolt that may be tightened or loosened. When the bolt is loosened while the guard is in working position, the guard may be swung back as indicated in the dotted lines in Fig. 3.

Figure 18:
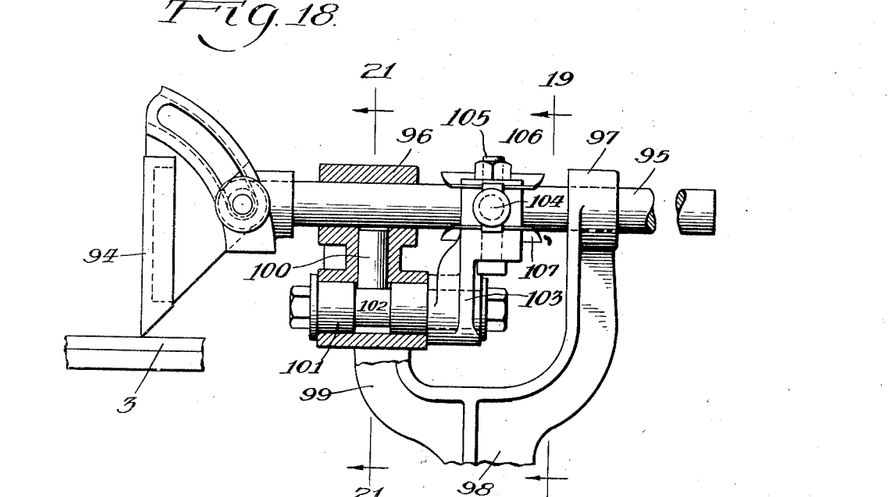
Fig. 18 is a view, on a larger scale, similar to Fig. 2, showing only a fragment of the machine, and the view being partly in section.

There is one other feature of the invention to be considered, namely the work guide or "fence". This device, indicated at 94, is of any usual or suitable type. The present invention is concerned only with the means for adjusting it whereby it may be quickly and accurately positioned at any desired distance from the work on the table. The guide or fence is carried on one end of a horizontal shaft 95 slidably supported above at one side of and at right angles to the length of the table in separated bearings 96 and 97, at the upper ends of the arms of a fork constituting the top of a stationary pedestal 98 rising from the base on which the motor is mounted. The position of the fence transversely of the table is changed by shifting the shaft 95 lengthwise. The shaft, and therefore the fence, are locked in place by a vertical pin 100 slidably mounted in the arm 99 of the pedestal just below the bearing 96. A short shaft 101, of considerable diameter, extends through the arm 99 below the pin 100 and parallel to the shaft 95. The shaft 101 has therein an eccentric part 102 in registration with the pin. The parts are so proportioned that in one angular position of the shaft 101, the eccentric forces the pin up against the shaft 95 and locks the shaft in place, as indicated in Fig. 22; whereas, in another angular position of the shaft 101, the pin is allowed to drop down and leave the shaft 95 free, as indicated in Figs. 18 and 21.

Fixed to one end of the shaft 101 is a radial arm 103. Pivoted to the free end of the arm is a handle 104, the pivot or hinge pin being at right angles to the shafts 101 and 95. At the inner end of the handle are two strong separated spring fingers, 106 and 107, projecting from the handle in the direction of its length. The fingers are spaced apart from each other a distance slightly less than the diameter of the shaft 95 and diverge from each other toward their outer ends to produce a flaring mouth to the space between them.

Figures 19, 20, 21, 22:
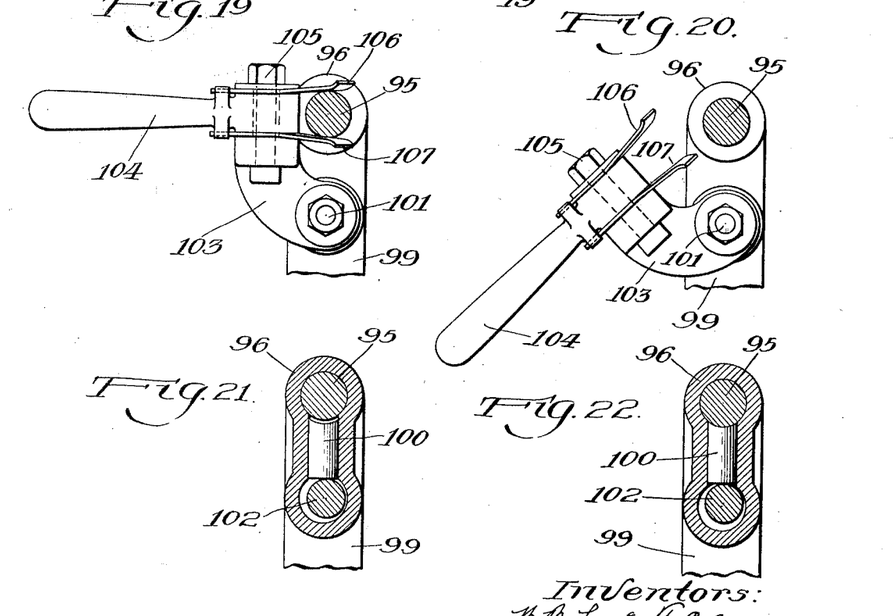
Fig. 19 is a section taken on line 19—19 of Fig. 18.
Fig. 20 is a view similar to Fig. 19, showing the operating handle swung down.
Figs. 21 and 22 are sections taken approximately on line 21—21 of Fig. 18; showing the locking device in release and locking positions, respectively.

The parts are so proportioned that when the handle 104 is swung up, as indicated in Fig. 19, the shaft 95 enters between the fingers on the handle and is yieldingly gripped by these fingers. This upward movement of the handle unlocks the shaft 95 as shown in Fig. 21. Then, if the handle is swung about its hinge pin 105, which now is in a vertical position, the shaft may be shifted lengthwise in either direction. After the shaft has been shifted into the proper position, the handle is simply swung down again to the position indicated in Fig. 20, causing the shaft to be locked as shown in Fig. 22.

In adjusting the fence transversely of the table, the handle 104 is first swung part way up to unlock the shaft 95, and then the fence is moved by hand into approximately the desired position. The handle is then swung all the way up to cause it to grip the shaft and is then swung toward the right or the left until the fence has been accurately positioned. In other words, coarse adjustments are quickly made by simply pushing the fence across the table by hand, the final fine adjustments being then effected by means of the handle; and, consequently, there will be no waste of time in shifting the fence from one working position to another.

It is customary to place behind circular saws blade-like guard plates set on edge. Such a plate, as indicated at 110 in Figs. 6 and 8, may conveniently be secured in proper relation to the saw 39 by fastening one end thereof to the bar 33 of the spider element of the tool carrier.

Figure 24:
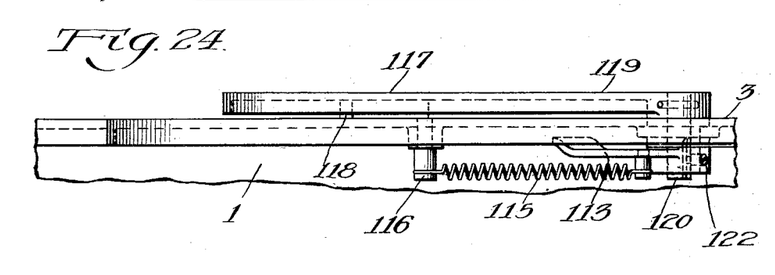
Fig. 24 is an edge view of the parts shown in Fig. 23.
Figure 25:
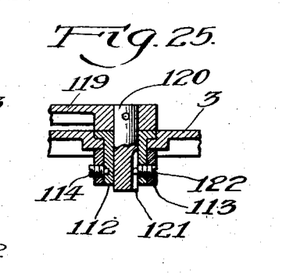
Fig. 25 is a section on line 25—25 of Fig. 23.

It is desirable to provide a guard to cover those portions of the sanding roll or jointer that do not come in contact with the work, when either of these tools is in use. We have illustrated such a guard in Figs. 23 to 25. Near the front of the section 3 of the table is an opening in which is located a bushing 112. One end of an arm 113, lying under the table, is slipped upon the bushing and secured thereto by a screw 114. A tension spring 115 is secured at one end to the arm 113 and at the other end to a pin 116 projecting down from the under side of the table. This spring tends constantly to swing the arm into a position in which the free end abuts against the side of the hollow base 1. These parts remain on the machine at all times. The guard itself is detachable, being applied only when needed. The guard is shown as composed of a broad plate-like member 117 having on the under side a rib 118 that rests on the table and holds the guard at some distance above the table. The guard has a long arm 119 at the free end of which is a stud 120 adapted to be inserted in the bushing 112. In the side of the stud at the lower end, is a longitudinal slot 121. There is a second screw 122 passing through the arm 113 and the bushing, the inner end of the screw being in position to enter the groove 121 in the stud 120 when the stud is inserted in the bushing. Thus the arm 113 and the guard are locked together to swing in unison about the long axis of the stud.

The parts are so proportioned that when the guard device is applied to the table, the guard proper overlies the jointer, provided the latter has been raised as indicated in Fig. 23, and prevents the workmen's hands from coming in contact with the jointer. However, as the work is moved along the table toward the jointer, it pushes the guard aside against the resistance of the spring, without leaving any part of the jointer exposed between the work and the guard. It should be noted that the rib is so placed on the guard that it at no time projects over the edge of the table section 3 into the space through which the jointer works, but always rests on top of this table section.

While we have illustrated and described with particularity only a single preferred form of our invention, we do not desire to be limited to the exact structural details thus illustrated and described, but intend to cover all forms and arrangement which come within the definitions of our invention constituting the appended claims.

We claim:

1. In a machine of the character described, a table, a carrier below the table and rotatable about an axis parallel to the latter, a plurality of rotatable tools mounted on the carrier in positions to be raised above the level of the table in certain angular positions of the carrier and be depressed below the carrier in certain other angular positions, a driving shaft extending into the carrier coaxial with the latter, driving connection between the driving shaft and the tools whereby all of the tools will revolve whenever the drive shaft is running, and means controlled by the drive shaft to cause one of said tools to reciprocate in the direction of its axis of rotation while rotating.

2. In a machine of the character described, a table, a carriage below the table rotatable about an axis parallel to the latter, a plurality of tools, including a saw, mounted on the carrier in positions to be alternately raised above and depressed below the table as the carrier is turned, a guard for the saw, and means controlled by the carrier to move the guard into operative relation to the saw when the latter is raised and to move the guard into an idle position when the saw is lowered.

3. In a machine of the character described, a hollow base having parallel opposed vertical walls, a table on said base, said walls having therein large circular openings directly opposite each other, a carrier having head elements lying outside of said walls and rotatable in said openings, connecting pieces extending across the base from one head to the other, tool-carrying shafts extending from one of the heads to and through the second head, a gear casing fixed to said second head and lying outside of the base, a drive shaft extending into said gear case parallel with the aforesaid shafts, and gearing in said gear case connecting all of said shafts together.

4. In a machine of the character described, a hollow base having parallel opposed vertical walls, a table on said base, said walls having therein large circular openings directly opposite each other, a carrier having head elements lying outside of said walls and rotatable in said openings, connecting pieces extending across the base from one head to the other, tool-carrying shafts extending from one of the heads to and through the second head, a gear casing fixed to said second head and lying outside of the base, a drive shaft extending into said gear case parallel with the aforesaid shafts, gearing in said gear case connecting all of said shafts together, means to lock the carriage against rotation in the base, and a single handle for controlling said locking means and turning the carrier.

5. In a machine of the character described, a hollow base, a table on the base, said base having parallel opposed walls having therein large circular openings directly opposite each other, two circular heads lying outside of said walls and having parts extending into and rotatably fitting in said openings, connecting pieces between said heads and forming therewith a tool carrier, a plurality of tools distributed about said carrier and spaced apart a substantial distance from one of said heads, a driving shaft extending into the base through the latter head, a suction fan device on the inner end of said shaft, and a partition surrounding the carrier within the base to separate from each other the space in which the fan lies and the space in which the tools lie, whereby the waste material will be drawn by the fan from the tool compartment to the opposite side of the partition.

6. In a machine of the character described, a hollow base, a table on the base, said base having parallel opposed walls having therein large circular openings directly opposite each other, two circular heads lying outside of said walls and having parts extending into and rotatably fitting in said openings, connecting pieces between said heads and forming therewith a tool carrier, a plurality of tools distributed about said carrier between the heads and spaced apart a substantial distance from one of said heads, a driving shaft extending into the base through the latter head, at least one of said heads being detachable from said connecting pieces so as to be removable and give access to the tools through the side of the base, and means to clamp the other head to the base to hold the carrier in place when the detachable head is removed.

7. In a machine of the character described, a hollow base, a tool carrier extending through and rotatable in a wall of the base and having a part lying outside of the base, a table on the base, a clamping bar on the inside of said wall, a movable handle on the part of the carrier lying without the base, and means arranged between the handle and the clamping bar to cause the bar and the part of the carrier lying outside of the base to be drawn together and clamp said wall between them in one position of the handle, whereas, in another position of the handle the clamping bar is held in a released position and the handle may be employed to turn the carrier.

In testimony whereof, we sign this specification.

WILLIAM B. LONG.
FRED C. AREY.